UNITED STATES PATENT OFFICE.

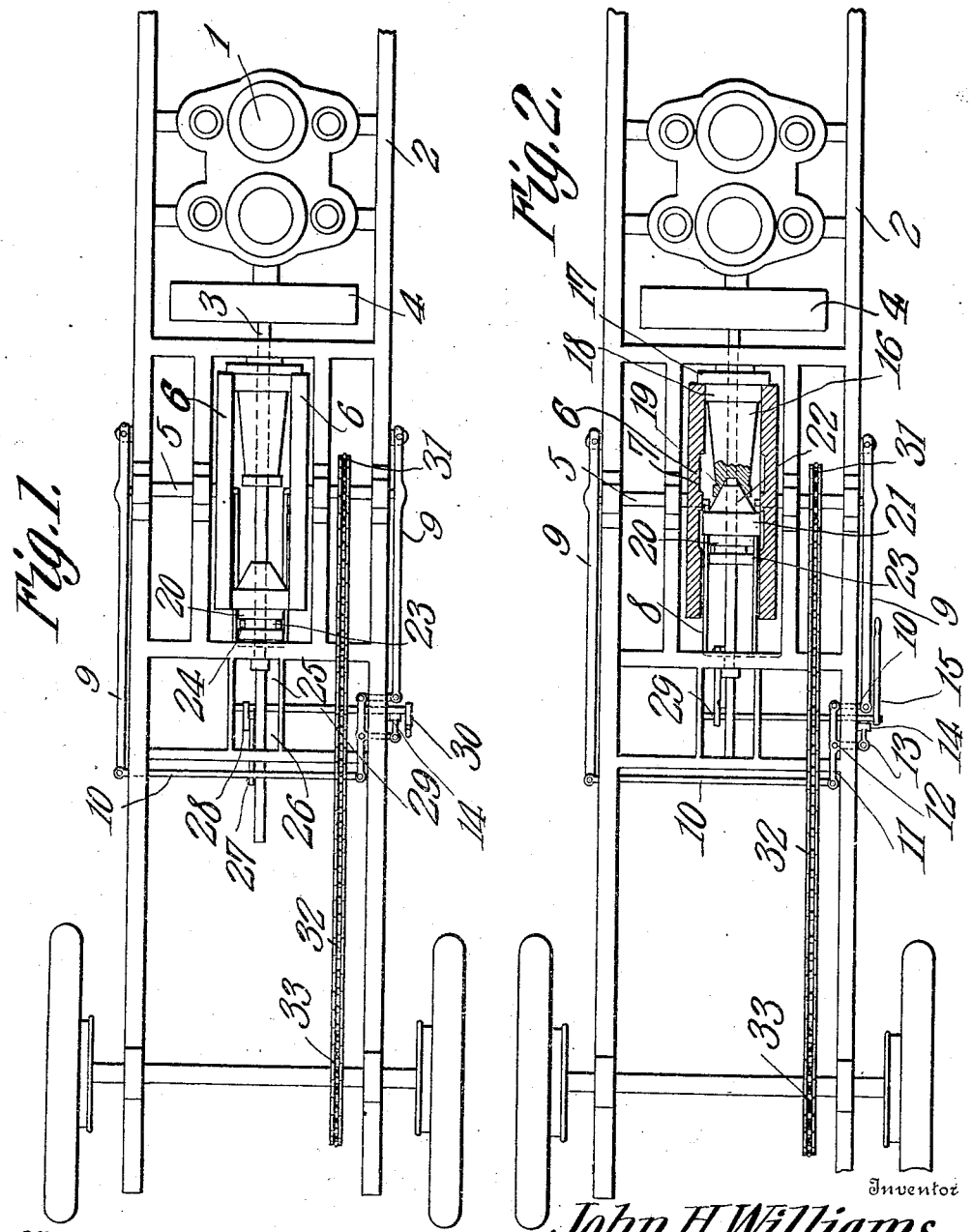

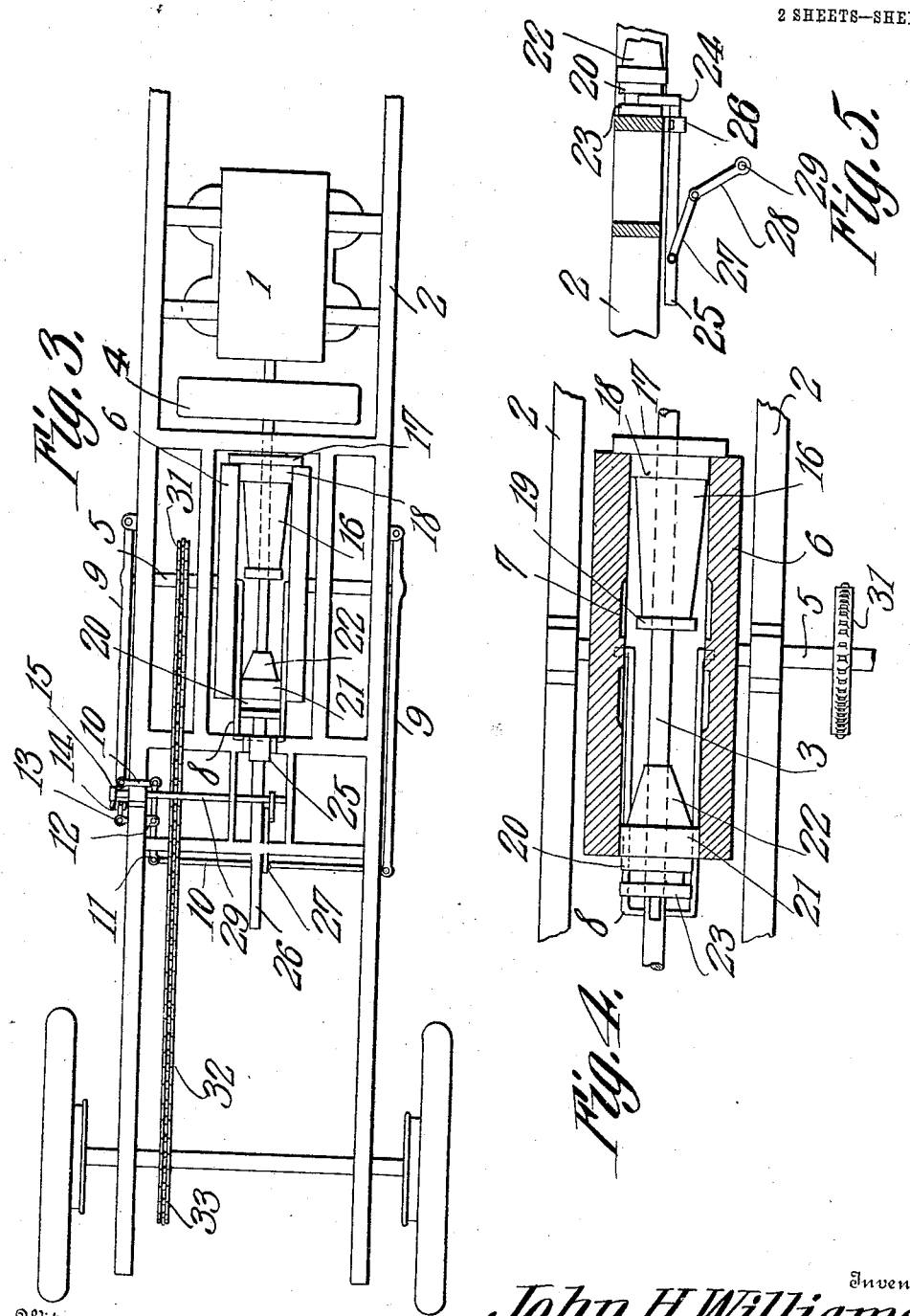

JOHN H. WILLIAMS, OF NEW LONDON, IOWA.

POWER-TRANSMISSION GEAR.

No. 910,623.  Specification of Letters Patent.  Patented Jan. 26, 1909.

Application filed May 15, 1908. Serial No. 433,117.

*To all whom it may concern:*

Be it known that I, JOHN H. WILLIAMS, a citizen of the United States, residing at New London, in the county of Henry and State of Iowa, have invented a new and useful Power-Transmission Gear, of which the following is a specification.

This invention has relation to power transmission gears especially adapted to be used upon automobiles and the like and it consists in the novel construction and arrangement of its parts hereinafter shown and described.

The object of the invention is to provide a frictional transmission gearing adapted to be used upon vehicles of the character indicated and which may be operated for driving the vehicle in a forward direction at varying rates of speed and which may also be operated to cause the vehicle to move in a rearward direction. The parts of the gearing may also be positioned with relation to each other whereby the vehicle may be brought to a state of rest without stopping the movement of the engine shaft.

The gearing consists primarily of twin disks which are mounted upon longitudinally shiftable stub shafts journaled for rotation in the frame of the vehicle. Said disks are provided at their centers and upon their inner faces with recesses and a spring mechanism is interposed between the disks and has contact with both and is under tension with a tendency to normally hold the said disks away from each other. The engine shaft passes between the said disks and a conical friction clutch member is slidably mounted upon the said engine shaft. The second friction member is loosely journaled upon the engine shaft but is held against longitudinal movement thereon. A lever mechanism is provided for moving the slidable friction member along the shaft toward and away from the loosely journaled friction member. The sliding friction member is adapted to move along the shaft so that its periphery will enter the recesses provided in the inner faces of the disks and at other times the said sliding friction member may be moved so that its periphery will be in contact with the faces of the opposite disks.

In the accompanying drawing:—Figure 1 is a top plan view of the transmission gear. Fig. 2 is a top plan view of the transmission gear showing parts in section. Fig. 3 is a bottom plan view of the transmission gear. Fig. 4 is a horizontal sectional view showing the transmission gear enlarged, and Fig. 5 is a side elevation of a portion of the mechanism showing means for shifting the clutch member which is slidably mounted upon the engine shaft.

Referring to the drawings 1 indicates the engine which is mounted upon the frame 2. Said engine is provided with a shaft 3 upon which is located a fly wheel 4. The stub shafts 5 are journaled in the frame 2 and are adapted to move longitudinally in their bearings. The said shafts 5 may also rotate and the disks 6 are mounted upon the inner ends of the said shafts 5. The shaft 3 passes through the space between the inner faces of the disks 6 and is diametrically disposed with relation to the said disk. The disks 6 are provided upon their inner faces and at their centers with the recesses 7 and the spring 8 is attached at an intermediate portion to the frame 2 and bears at its ends against the inner ends of the shaft 5. The said spring 8 is under tension with a tendency to hold the inner ends of the shafts 5 apart.

The levers 9 are fulcrumed to the side members of the frame 2 and bear at intermediate points against the outer ends of the stub shafts 5. The rear ends of the levers 9 are pivotally connected with transversely disposed links 10 which in turn are pivotally connected with the oppositely disposed arms 11 mounted upon the vertically journaled shaft 12. The shaft 12 is also provided with an arm 13 which is connected by means of a link 14 with a lever 15. The said lever is fulcrumed for movement upon the frame 2. Thus it will be seen that when the lever 15 is swung that the shaft 12 will be turned and through the arms 10 and links the lever 9 will be swung so that the stub shaft 5 may be shifted longitudinally against the tension of the springs 8. Thus the inner ends of the said stud shafts and the disks 6 mounted thereon may be brought toward each other.

The friction member 16 is loosely mounted upon the shaft 3 and is provided at one end with a flange 17 which is adapted to engage the peripheries of the disks 6. The said member 16 is provided in the vicinity of the flange 17 with a cylindrical portion 18 which engages the outer portion of the inner faces of the disks 6. The opposite end portion of the said member 16 is reduced in transverse dimensions and is provided with a conical socket 19.

The friction member 20 is slidably mounted upon the shaft 3 and rotates with the same. Said member is provided at an intermediate point with a cylindrical section 21 which is adapted to engage the inner faces of the disks 6. The said member 20 is also provided with a conical end portion 22 which is adapted at times to engage and disengage the conical socket 19 provided in the member 16. The opposite end portion of the member 20 is provided with an annular groove 23 which is adapted to engage the bifurcated end 24 of an arm 25 which is mounted for longitudinal movement in the guide 26 attached to the under side of the frame 2. The link 27 is pivotally connected with the arm 25 and is also pivotally connected with a crank arm 28 mounted upon the shaft 29. The operating handle 30 is mounted upon the outer end of the shaft 29.

The sprocket wheel 31 may be mounted upon one of the stub shafts 5 and a sprocket chain 32 may pass around the sprocket wheel 31 and a sprocket wheel 33 mounted upon one of the axles of the vehicles. Or if desired other means may be employed for transmitting movement from one of the stub shafts 5 to one of the axles of the vehicle.

Thus it will be seen that when the lever 15 is swung that the disks 6 may be moved away from each other and that their inner faces will be moved out of contact with the cylindrical portions of the friction members mounted upon the shafts 3, and when the said disks are so moved no motion is transmitted from the engine shaft 3 to the stub shafts 5. When however, the lever 15 is swung so that the inner faces of the disks 6 are brought relatively together the said faces of the disks come in contact with the cylindrical portion 21 of the friction members of 16 and 20 and rotary movement is transmitted from the engine shaft 3 through the member 20 to the disk 6 which in turn rotate the stub shafts 5 and the member 16 evenly distributes the stress between the disks 6 so that the said disks are not strained in their mountings upon the stub shafts 5. The above movement takes place when the cylindrical portion 21 of the member 20 is adjacent the outer portions of the faces of the disks 6. When however, the cylindrical portion 21 of the said member 20 is moved opposite the recesses 7 in the disks 6 the said member is out of frictional contact with the disks 6 and the transmission of movement to the said disk is interrupted. When the member 20 is moved longitudinally along the shaft 3 so that the conical end 22 thereof comes in contact with the conical socket 19 provided at the inner end of the member 16, the frictional contact between the said conical end 22 and socket 19 is sufficient to cause the member 16 to rotate in the same direction as that in which the member 20 is rotating with the shaft 3. Thus rotary movement is transmitted from the shaft 3 through the member 20 to the member 16 which in turn transmits the said rotary movement from the cylindrical portion 18 thereof to the disks 6. When movement is transmitted to the disks 6 from the member 16 the said disks rotate in an opposite direction from that in which they rotate when the movement is transmitted thereto from the member 20. Thus it will be seen that means is provided for reversing the motion transmitted from the engine shaft to the stub shaft and that by shifting the member 20 along the shaft 3 movement in a forward direction may be transmitted to the stub shafts 5 at a greater or less speed as desired. When however, reversing or backing movement is transmitted to the said stub shafts 5 it is always at a uniform rate of speed as the member 16 cannot move longitudinally along the engine shaft 3 and consequently the part 18 of the said member 16 always has contact with the faces of the disks 6 at the same distance from the centers thereof.

Having described my invention what I claim as new and desire to secure by Letters-Patent is:—

1. In combination with an engine shaft, a power transmission gear comprising disks located at opposite sides of the shaft and adapted to move laterally with relation to the shaft, a spring interposed between the disks and being under tension with a tendency to force the same apart, lever mechanism for moving the disks toward each other against the tension of said spring, a friction member loosely mounted upon the shaft and being located between the disks, and a friction member slidably mounted upon the engine shaft and rotating with the same and adapted to be forced into frictional contact with the first said friction member.

2. A transmission gear comprising a driving member, driven members, and intermediate members one of which is slidably mounted upon the driving member and rotates with the same and the other of which is loosely mounted upon the driving member, said intermediate members adapted to have frictional contact with each other at times, and at other times having frictional contact with the driven members at opposite sides thereof.

3. A transmission gear comprising a driving member, driven members, and intermediate members mounted upon the driving member and adapted to have frictional contact with each other at times and at other times having frictional contact with the driven members at opposite sides thereof.

In testimony that I claim the foregoing as my own, I have hereto affixed my signature in the presence of two witnesses.

JOHN H. WILLIAMS.

Witnesses:
W. H. PIXLEY,
E. S. KNICKERBOCKER.